J. GRIMM.
Coal-Drilling Machines.
No. 5,499. Reissued July 22, 1873.
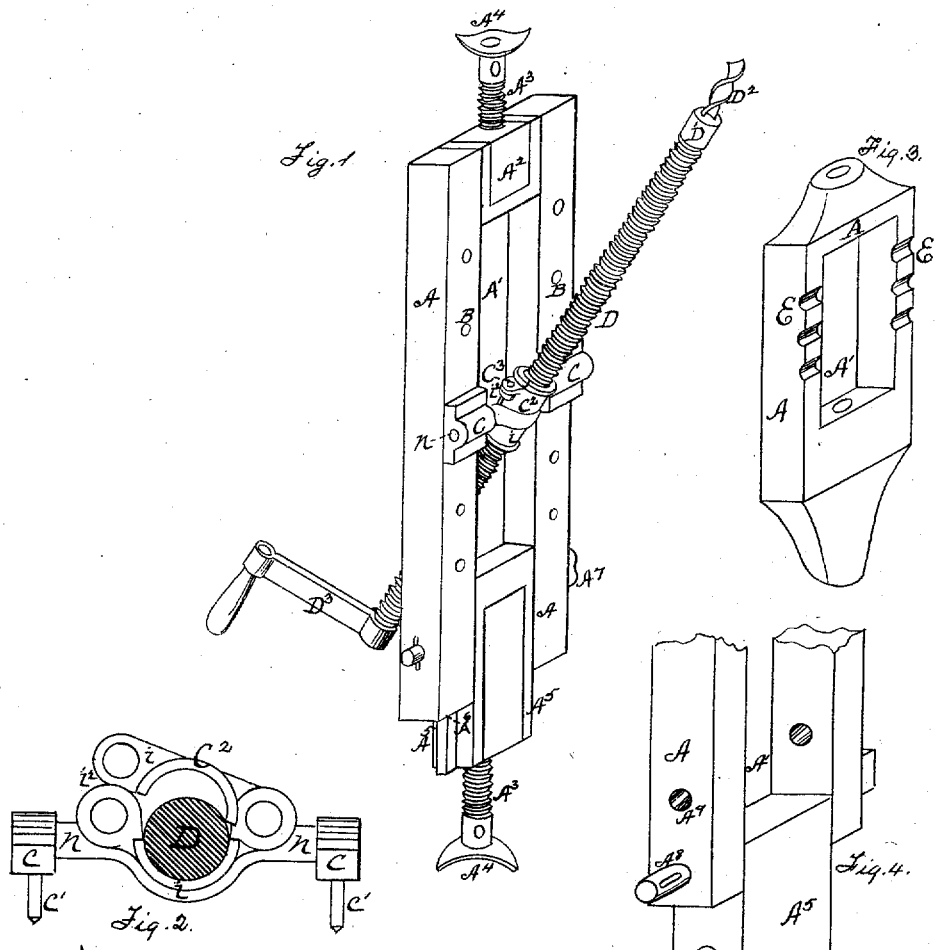
WITNESSES
James J. Kay
R. E. Henderson
INVENTOR
John Grimm
by Bakewell Christy & Kerr
his attys
AM. PHOTO-LITHOGRAPHIC CO. N.Y. (OSBORNE'S PROCESS.)

UNITED STATES PATENT OFFICE.

JOHN GRIMM, OF DARLINGTON TOWNSHIP, BEAVER COUNTY, PA.

IMPROVEMENT IN COAL-DRILLING MACHINES.

Specification forming part of Letters Patent No. 97,080, dated November 23, 1869; reissue No. 5,499, dated July 22, 1873; application filed April 9, 1873.

*To all whom it may concern:*

Be it known that I, JOHN GRIMM, of Darlington township, in the county of Beaver and State of Pennsylvania, have invented a new and useful Improved Coal-Drilling Machine; and I do hereby declare the following to be a full, clear, and exact description thereof, reference being had to the accompanying drawing forming a part of this specification, in which—

Figure 1 is a perspective view of my improved coal-drilling machine. Fig. 2 is an end view of the box-nut or screw-bearing through which the drill-spindle operates. Fig. 3 is a perspective view of a modified form of the supporting post or standard; and Fig. 4 is a view of the extension end of the post, in which the slide is shown as unprovided with guides, such as are shown in Fig. 1.

Like letters of reference indicate like parts in each.

Prior to my invention very few, if any, hand coal-drilling machines had been made which were practically operative, and none have gone into general use. All such machines have been either too heavy, too intricate in construction, difficult to operate, or liable to get out of order.

My invention consists of a light portable machine, which is simple in construction and operation, and is not liable to get out of order; and its principal features are, first, a post or standard having a longitudinal center opening, either with or without a sliding or extension end, by means of which it may be lengthened at pleasure, and at each end a set bolt or clamp for securing the post firmly in position in the shaft of a coal-mine; second, a pivoted jointed nut or box for holding the threaded spindle of the drill which projects through the longitudinal opening of the standard, such nut being adjustable on the standard, so that it may be placed at various heights.

To enable others skilled in the art to make and use my improvement, I will describe its construction and manner of use.

The post or standard A is a rectangular frame, which has a longitudinal opening, $A^1$, at or near its center. The upper end of the frame is closed by a head, $A^2$, which is tapped and threaded for the reception of the screw-bolts $A^3$. The lower end of the frame is closed by an adjustable slide, $A^5$, which is designed to lengthen the standard A to any desired length to accommodate it to mines having shafts of different heights. This slide or extension end moves in grooves $A^6$ in the sides of the standard A, and is adjusted by set-screws $A^7$ working through the sides of the standard A against it, as in Fig. 1; or the contiguous faces of the post and slide are plain, as shown in Fig. 4, and the slide is adjusted by means of the bolts $A^8$, which pass through the holes $A^9$, and through the post and slide, as shown. The lower end of the slide $A^5$ is tapped and threaded for the reception of screw-bolts $A^3$. The bolts are provided with pointed clamps $A^4$ for giving them a firmer hold upon the bearing-surface, and with eyes for the insertion of a bar for turning the screw-bolts. The function of the screw-bolts $A^3$ is to secure the standard A firmly in position. The standard being made of the proper length by means of the slide $A^5$ to fit loosely between its upper and lower bearing-surfaces, it is fixed by turning up the screw-bolts $A^3$ until the clamps take a firm hold in the rock. In the front face of the side pieces of the standard A, I make a series of perforations, B. These perforations are designed to receive the stems $C^1$ of the brackets C, which support the journals N of the nut $C^2$. The nut $C^2$ holds or sustains the threaded spindle D of the drill, and for that purpose is threaded on its inner side. It is made in two parts or sections, *i*, which are hinged at $i^1$, and held shut by a pin or key, $C^3$, passing through tapped lugs $i^2$; it is also furnished with journals *n*, extending at right angles from its sides, by means of which it turns on its bearings to operate the drill at any desired angle. The threaded spindle D is provided at one end with a socket, $D^1$, for the attachment of the drill $D^2$, and at the other end with a crank, $D^3$. The nut $C^2$ is hung by its journals N in the bearings C across the longitudinal opening $A^1$, and the threaded spindle D is placed in it, and it is closed and secured by the pin through the lugs $i^2$.

The operation of this machine is as follows: The standard A, being adjusted to the proper length by means of the slide $A^5$, is placed in the desired position in a coal-mine, and the screw-bolts $A^3$ turned up, so that the clamps $A^4$ shall take a firm hold against the roof and floor of the mine; then the drill-spindle D is placed in the nut $C^2$, and secured therein by closing and fastening it, as described. The nut $C^2$ being pivoted by means of its journals N in the bearings C, the drill may be directed at any desired angle within its range. The drill $D^2$ is operated by means of the crank $D^3$, and is thereby caused to advance and cut into the coal. The pitch of the thread on the spindle depends on the nature of coal or slate to be drilled. For bituminous or soft coal a coarse pitch may be used, but for hard coal a finer one is requisite. The pitch of the thread varies, under ordinary circumstances, from eight threads to an inch to twelve to an inch. When the drill $D^2$ has penetrated to desired depth, the nut $C^2$ is opened, so that the drill may be withdrawn with ease and quickness instead of unscrewing slowly through the nut.

Instead of the brackets C, curved bearings E, Fig. 3, may be recessed in the face of the standard A. In this case the nut $C^2$ is held in the bearings by the backward pressure of the drill against the standard. The standard being rigid, and the pressure in the operation of drilling being directly back against the threads of the nut $C^2$, the nut cannot escape from its bearings until the pressure is removed.

In Fig. 3 is shown a modified and cheaper form of standard or post, which consists simply of a solid post cut out in the center to form the longitudinal opening $A^1$. In this post the extension end is dispensed with.

What I claim as my invention, and desire to secure by Letters Patent, is—

1. The threaded drill-spindle D, in combination with the screw-bearing $C^2$ and the standard A, substantially as and for the purposes described.

2. The jointed pivoted box-nut or screw-bearing $C^2$, jointed in a line parallel with line of its bearing, and pivoted by journals extending out at right angles thereto, substantially as and for the purposes described.

3. The post or standard A for sustaining the drilling-tools, either with or without an extension end, and having bearings upon its face, a center longitudinal opening, $A^1$, and clamp-screws $A^3$ at its ends, substantially as and for the purposes set forth.

In witness whereof I, the said JOHN GRIMM, have hereunto set my hand.

JOHN GRIMM.

Witnesses:
A. S. NICHOLSON,
THOS. B. KERR.